US012769591B2

(12) United States Patent
Sundar et al.

(10) Patent No.: US 12,769,591 B2
(45) Date of Patent: Oct. 20, 2026

(54) ASYMMETRIC DISTRIBUTED COMPUTE NODES FOR PROVIDING SOFTWARE-DEFINED VEHICLE FUNCTIONS

(71) Applicant: Fisker Inc., Manhattan Beach, CA (US)

(72) Inventors: Shyam Sundar, Manhattan Beach, CA (US); Shirish Kumar Halingali, Bangalore (IN); Bhushan Joshi, Pune (IN)

(73) Assignee: Fisker IP/Austria Assets Trust, New York, NY (US)

( * ) Notice: Subject to any disclaimer, the term of this patent is extended or adjusted under 35 U.S.C. 154(b) by 517 days.

(21) Appl. No.: 18/364,181

(22) Filed: Aug. 2, 2023

(65) Prior Publication Data

US 2025/0045124 A1 Feb. 6, 2025

(51) Int. Cl.
*G06F 9/50* (2006.01)
*B60W 50/00* (2006.01)

(52) U.S. Cl.
CPC ....... *G06F 9/5083* (2013.01); *B60W 50/0098* (2013.01); *G06F 9/505* (2013.01)

(58) Field of Classification Search
CPC ...... G06F 9/5083; G06F 9/505; G06F 9/5088; G06F 9/5044; B60W 50/0098; H04L 67/1017; H04L 67/12
USPC .......................................................... 718/104
See application file for complete search history.

(56) References Cited

U.S. PATENT DOCUMENTS

2004/0066745 A1* 4/2004 Joe ...................... H04L 67/1001 370/235
2004/0243709 A1* 12/2004 Kalyanavarathan ......................... H04L 67/1001 709/226
2005/0223574 A1* 10/2005 Fillatreau ............... G01C 17/38 33/356
2006/0094350 A1* 5/2006 Ishimura ................. G01S 13/78 342/127

(Continued)

FOREIGN PATENT DOCUMENTS

WO 2015115852 A1 8/2015

OTHER PUBLICATIONS

Extended European Search Report for EP Application No. 24192462.0 mailed Nov. 27, 2024, 8 pages.

(Continued)

*Primary Examiner* — Tuan C Dao

(57) ABSTRACT

The technology disclosed herein enables software-defined functions in a vehicle using asymmetric distributed compute nodes. In a particular example, a system includes one or more higher-performance compute nodes of the asymmetric distributed compute nodes and one or more lower-performance compute nodes of the asymmetric distributed compute nodes. The system further includes a communication backbone over which the higher-performance compute nodes and the lower-performance compute nodes communicate. The one or more higher-performance compute nodes execute first processes for performing a first portion of the software-defined vehicle functions for the vehicle and the one or more lower-performance compute nodes execute second processes for performing a second portion of the software-defined vehicle functions for the vehicle.

19 Claims, 8 Drawing Sheets

(56) References Cited

U.S. PATENT DOCUMENTS

| | | | | |
|---|---|---|---|---|
| 2009/0193243 | A1* | 7/2009 | Ely | G06F 1/3293 713/320 |
| 2010/0011085 | A1* | 1/2010 | Taguchi | G06F 11/3433 709/214 |
| 2014/0196050 | A1* | 7/2014 | Yu | G06F 9/5094 718/104 |
| 2016/0004569 | A1* | 1/2016 | Kim | G06F 9/5027 718/104 |
| 2016/0062798 | A1* | 3/2016 | Lee | G06F 9/5094 718/104 |
| 2018/0373078 | A1* | 12/2018 | Mizuno | G09G 3/36 |
| 2019/0108066 | A1 | 4/2019 | Kim et al. | |
| 2019/0391846 | A1* | 12/2019 | Kobayashi | G06F 9/5094 |
| 2021/0144517 | A1* | 5/2021 | Guim Bernat | G06F 9/5072 |
| 2021/0157642 | A1* | 5/2021 | Nikhil | G06N 5/025 |
| 2024/0027996 | A1* | 1/2024 | Yang | G05B 19/4099 |

OTHER PUBLICATIONS

Syed, Ammad Ali et.al, “Dynamic Scheduling and Routing for TSN based In-vehicle Networks,” 2021 IEEE International Conference on Communications Workshops, Jun. 14, 2021, pp. 1-6.

* cited by examiner

100

ASYMMETRIC DISTRIBUTED COMPUTE NODES FOR PROVIDING SOFTWARE-DEFINED VEHICLE FUNCTIONS

BACKGROUND

Traditionally, even as vehicles came to include more electronic components, each component operated independently of the others. For example, a vehicle may include power windows, power seats, automatic wipers, a radio, or some other type of electronic components providing vehicle functions-including combinations thereof. Each component may include its own processing circuitry to control the component and, depending on the type of component, may include wiring routed to different areas of the vehicle where different components are located. For example, power windows may require wires running from the switches and to the various windows being controlled. All the different components make it difficult, if not impossible, to update or expand features of the vehicle and wiring between components increases manufacturing complexity and costs for the vehicle.

SUMMARY

The technology disclosed herein enables software-defined functions in a vehicle using asymmetric distributed compute nodes. In a particular example, a system includes one or more higher-performance compute nodes of the asymmetric distributed compute nodes and one or more lower-performance compute nodes of the asymmetric distributed compute nodes. The system further includes a communication backbone over which the higher-performance compute nodes and the lower-performance compute nodes communicate. The one or more higher-performance compute nodes execute first processes for performing a first portion of the software-defined vehicle functions for the vehicle and the one or more lower-performance compute nodes execute second processes for performing a second portion of the software-defined vehicle functions for the vehicle.

In another example, a method includes identifying first processes for execution on one or more higher-performance compute nodes of the asymmetric distributed compute nodes and identifying second processes for execution on one or more lower-performance compute nodes of the asymmetric distributed compute nodes. The method further includes directing the one or more higher-performance compute nodes to execute the first processes to perform a first portion of the software-defined vehicle functions for the vehicle and directing the one or more lower-performance compute nodes to execute the second processes to perform a second portion of the software-defined vehicle functions for the vehicle.

In a further example, an apparatus includes one or more microprocessors that execute first processes for performing a first portion of the software-defined vehicle functions for the vehicle. The apparatus also includes input and output interfaces connected to vehicle components of the vehicle and a network interface connected to a communication backbone to communicate with other compute nodes of the asymmetric distributed compute nodes. The other compute nodes execute second processes for performing a second portion of the software-defined vehicle functions for the vehicle.

In other examples, an apparatus performs the above-recited methods and computer readable storage media directs a processing system to perform the above-recited methods.

DETAILED DESCRIPTION

Vehicle functions may be handled by a single compute system, sometimes referred to as an Electronic Compute Unit (ECU). An ECU may use a single microprocessor, microcontroller, and/or a system-on-a-chip (SoC) to run a software operating system and applications to provide vehicle functions. The single computer interacts with other systems in the vehicle, including other single computers for vehicle components through external interfaces such as Universal Serial Bus (USB), universal asynchronous receiver-transmitter (UART), Controller Area Network (CAN) bus, Controller Area Network Flexible Data-Rate (CANFD) bus, Local Interconnect Network (LIN) bus, Ethernet, or some other communication convention-including combinations thereof. Typically, the ECU performs a different function than other computing components in the vehicle are capable of performing. When the ECU reaches its capacity for executing applications for the vehicle, no additional features defined by those applications can be added to the vehicle unless other features are removed or the software for the applications is otherwise pared down.

Using a network of distributed compute nodes, rather than a single ECU, increases the capacity in a vehicle for executing software that provides vehicle functions. While the ECU described above may be able to execute a software process, the other computing components are not designed to execute the process (e.g., are based on a different processing architecture) or there is otherwise no mechanism for executing the process on one of the other components (e.g., no connection or protocol needed to provide instructions to execute the process). Using a network of similar compute nodes enables the process to run on any one of the nodes. Nodes can, therefore, share the processing load and, in some situations, may serve as a backup node should another node fail. Moreover, not all nodes need have the same level of performance as many vehicle functions require relatively low processing power. The nodes may be asymmetric in their performance capabilities with some nodes having lower performance capabilities than other nodes. Processes that can be adequately executed on a lower-performance node may be offloaded to such a node thereby enabling a higher-performance node to execute other processes. Computing devices having lower performance typically cost less than their higher-performance counterparts, which leads to savings over installing all higher-performance nodes in a vehicle.

Figure 1:
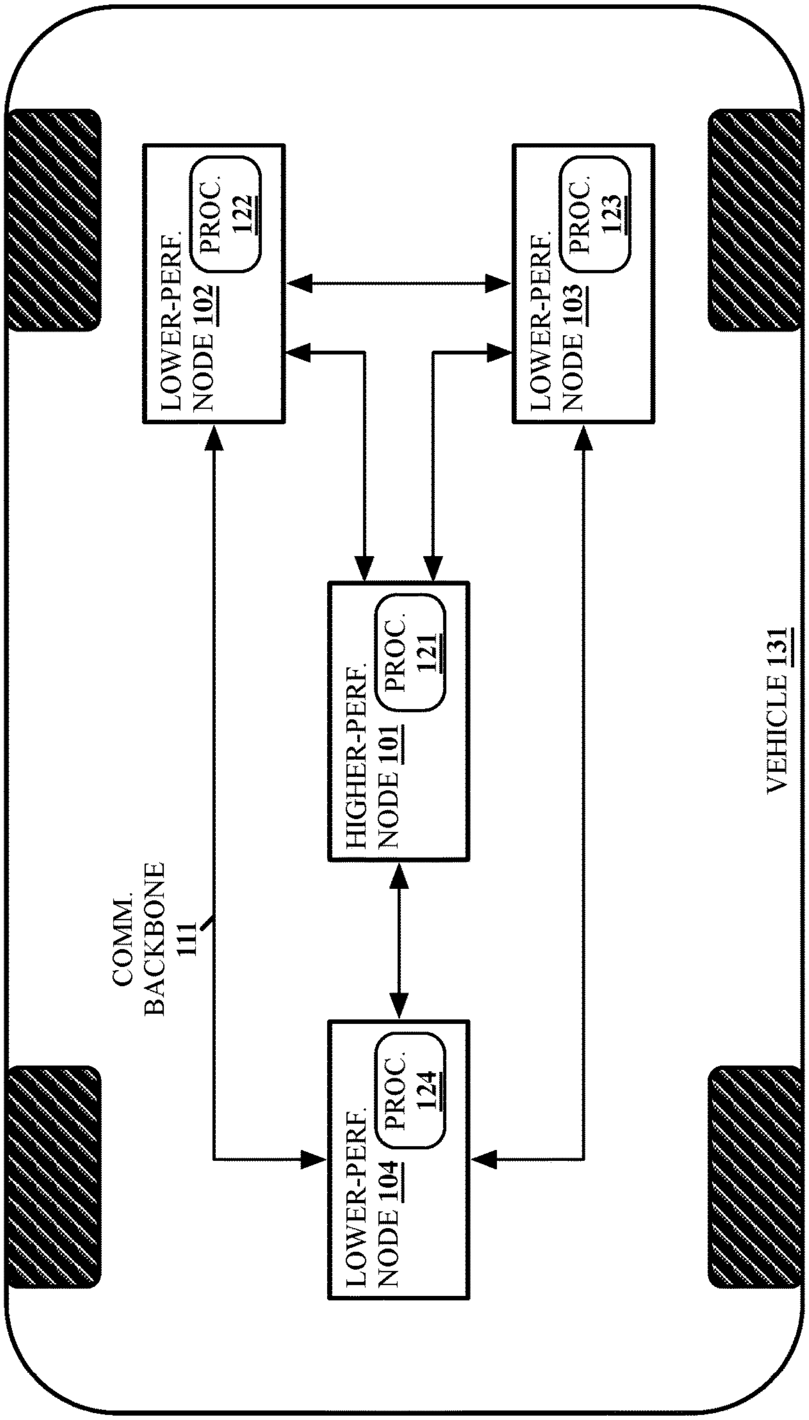
FIG. 1 illustrates an implementation for providing software-defined vehicle functions using asymmetric distributed compute nodes.

FIG. 1 illustrates implementation 100 for providing software-defined vehicle functions using asymmetric distributed compute nodes. Implementation 100 includes higher-performance node 101, lower-performance nodes 102-104, and communication backbone 111, which are all installed within vehicle 131. Higher-performance node 101 executes processes 121 and lower-performance nodes 102-104 execute respective processes 122-124. While vehicle 131 is represented as a view from above/below a four wheeled passenger vehicle (e.g., car, truck, van, etc.), vehicle 131 may be any type of vehicle, such as a semi-trailer truck, box truck, tractor, boat, airplane, or any other type of vehicle.

In operation, asymmetric distributed compute nodes 101-104 are asymmetric in the sense that the performance capabilities of each node are not the same. Higher-performance node 101 has higher performance capabilities than lower-performance nodes 102-104. Higher-performance node 101 may be higher performance than lower-performance nodes 102-104 due to having more processing cores, one or more faster processing cores, more memory (e.g., random access memory (RAM), cache memory, etc.), faster memory, faster communication circuitry, additional/different peripherals (e.g., a wireless modem), or some other computing component that enhances capabilities of higher-performance node 101 relative to capabilities of lower-performance nodes 102-104—including combinations thereof. While differing in performance, asymmetric distributed compute nodes 101-104 share a common computing architecture such that the instructions of processes 121-124 can execute on any of asymmetric distributed compute nodes 101-104. Vehicle 131 includes two tiers of nodes, but other examples may include one or more additional node tiers. For example, a medium-performance node may be present in a different implementation with the medium-performance node having higher performance capabilities than lower-performance nodes 102-104 but lower performance capabilities than higher-performance node 101. Also, in other examples, vehicle 131 may include different numbers of each tier of node. For instance, vehicle 131 may include more than one higher-performance compute node and/or some number other than three lower-performance compute nodes.

Asymmetric distributed compute nodes 101-104 communicate over communication backbone 111. Communication backbone 111 may include metallic, wireless, or optical links—or some combination thereof. Communication backbone 111 may use Internet Protocol (IP), Ethernet, optical networking, wireless protocols, communication signaling, or some other communication format—including combinations thereof. While communication backbone 111 is shown as having a direct link between each of asymmetric distributed compute nodes 101-104 to others of asymmetric distributed compute nodes 101-104, other network arrangements may be used. For instance, a network router or switch may be employed to direct traffic between asymmetric distributed compute nodes 101-104, which may enable each of asymmetric distributed compute nodes 101-104 to use one port to communicate with other nodes. In some of the alternative examples, network routing functionality may be included in one or more of asymmetric distributed compute nodes 101-104. For instance, lower-performance nodes 102-104 may each connect to higher-performance node 101 and higher-performance node 101 may handle the routing of traffic between lower-performance nodes 102-104. In some examples, communication backbone 111 may be used to connect other components of vehicle 131 outside of asymmetric distributed compute nodes 101-104.

Processes 121-124 execute to provide vehicle functions. The processes may be provided by a manufacturer of vehicle 131 or may be provided by a third party (e.g., the manufacturer of vehicle 131 may provide a development kit for third parties to develop processes for vehicle 131). As the processes are software instructions, the vehicle functions can be considered software defined. For example, while a separate controller may have been used previously to perform an automatic headlight function (e.g., a function that turns the headlights on or off depending on the light outside), that function can now be controlled via software rather than requiring a separate controller. Other example vehicle functions may include windshield wipers, exterior lighting, interior lighting, door locks/latches, steering wheel positioning, pedal positioning, mirror adjustment, radio/media handling (e.g., infotainment), engine or electric motor controls, battery charging, power seat adjustment, HVAC (Heating, Ventilation, and Air Conditioning), safety mechanisms (e.g., automatic braking, traction control, etc.), diagnostic tools, artificial intelligence (AI) algorithms, or any other type of function that a vehicle may include. In some examples, vehicle functions may be categorized into what the automotive industry commonly refers to as domains. Example domains may include powertrain, battery, electrical, infotainment, lighting, body, chassis, and advanced driver-assistance system (ADAS). While not shown, one or more of asymmetric distributed compute nodes 101-104 may be connected to vehicle components that are controlled by processes 121-124. For example, lower-performance node 103 may include an interface connected to brake lights of vehicle 131. Lower-performance node 103 can turn the brake lights off or on using the interface. For example, the interface may supply power to the brake lights when the brake lights should be turned on or may provide a signal to a power supply for the brake lights directing the power supply to power the brake lights when the brake lights should be turned on. Since vehicle components are located throughout vehicle 131, asymmetric distributed compute nodes 101-104 may similarly be distributed throughout vehicle 131 to connect with those components. Connecting a component to a nearby node lessens the amount of wiring needed had the component needed to connect to a compute unit located elsewhere in vehicle 131 (e.g., to a centralized ECU). The material savings increase as more components are connected to nearby nodes rather than a centralized compute unit and those savings translate into monetary cost savings. Likewise, reducing the complexity of wiring throughout the vehicle simplifies manufacturing and troubleshooting when a component does not work properly.

In some examples, other computing components may still exist in vehicle 131 beyond asymmetric distributed compute nodes 101-104 and may be connected to one or more of asymmetric distributed compute nodes 101-104 either via communication backbone 111 or a separate interface. For example, an engine or motor controller may remain separate from asymmetric distributed compute nodes 101-104 but may feed information to asymmetric distributed compute nodes 101-104 that may be used by one of processes 121-124 (e.g., a process that presents vehicle status information to a user).

Figure 2:
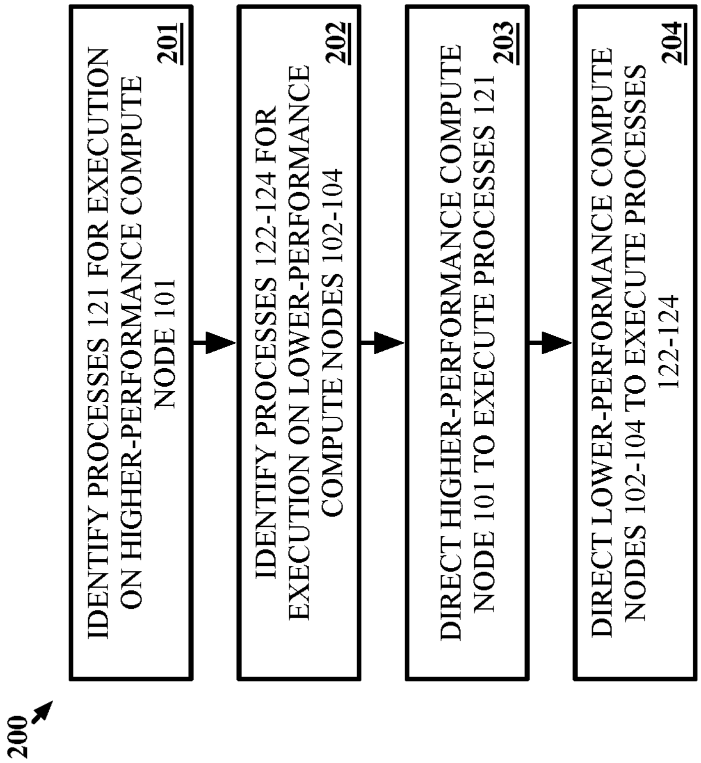
FIG. 2 illustrates an operation to provide software-defined vehicle functions using asymmetric distributed compute nodes.

FIG. 2 illustrates operation 200 to provide software-defined vehicle functions using asymmetric distributed compute nodes. In operation 200, processes 121 are identified for execution on higher-performance node 101 (step 201). Processes 122-124 are identified for execution on lower-performance nodes 102-104 (step 202). Processes 121-124 may be identified for higher-performance node 101 or lower-performance nodes 102-104 individually as they are received by asymmetric distributed compute nodes 101-104 (e.g., when received for installation from a memory device attached to one of asymmetric distributed compute nodes 101-104, received over a wireless network, such as during an over-the-air software update) or may be identified in one or more batches if multiple processes are received at once. A process executing on one of asymmetric distributed compute nodes 101-104 may be configured to at least determine a type of node on which a process should execute (e.g., on higher-performance node 101 or one of lower-performance nodes 102-104) but may further determine a specific node on which certain processes should run. For instance, higher-performance node 101 may execute a control process to control the distribution of processes 121-124 between asymmetric distributed compute nodes 101-104. The control process may not only determine whether a process should execute on higher-performance node 101 or one of lower-performance nodes 102-104 but also determine on which specific one of lower-performance nodes 102-104 the process should execute. In some examples, one or more of processes 121-124 themselves may indicate the respective nodes on which they should execute. For example, each of processes 121-124 may have been written to execute on a specific node of asymmetric distributed compute nodes 101-104 and may indicate the specific node to control process.

After identifying the respective nodes of asymmetric distributed compute nodes 101-104 for processes 121-124, higher-performance node 101 is directed to execute processes 121 to perform a first portion of the software-defined vehicle functions for vehicle 131 (step 203). Likewise, lower-performance nodes 102-104 are directed to execute the processes 122-124 to perform a second portion of the software-defined vehicle functions for the vehicle (step 204). The control process mentioned above may direct the processes to be assigned to the identified nodes. Assigning a process to a node may include sending the program instructions for the process to the node for installation thereon. For example, higher-performance node 101 may receive the program instructions for one of processes 122 and may send those program instructions to lower-performance node 102 for execution. In other examples, the program instructions may be received at lower-performance node 102 from some other source.

Once processes 121-124 are distributed across asymmetric distributed compute nodes 101-104, the software-defined vehicle functions facilitated by processes 121-124 are provided like they would have been had processes 121-124 been executing on a single node, such as an ECU described above. Additionally, since more than one node is available to potentially execute a process, processes can be reassigned between asymmetric distributed compute nodes 101-104 (e.g., if the overall performance of processes 121-124 would be better with a different distribution of processes). Similarly, nodes may be backups to one another for certain processes. For example, processes 122 and processes 123 may include instances of the same process with one being active and the other on standby. Should something cause the active process to fail or otherwise not perform up to desired standards (e.g., a kernel crash on the node), then the standby process can be directed to takeover. A control process, such as the control process that handles the distribution of processes, may also handle the failure recognition and standby process activation responsive thereto. If a process does not have a standby process executing on another node, another node may still be used as a failover node by initiating the process on the other node after failure. Processes that are not critical to safety features of the vehicle may use this approach since non-safety processes can afford to be down while a new instance initiates. Lower-performance nodes 102-104 may also be able to backup higher-performance node 101 even if one or more of processes 121 would need to run in a reduced capacity to account for performance differences between the nodes.

Figure 3:
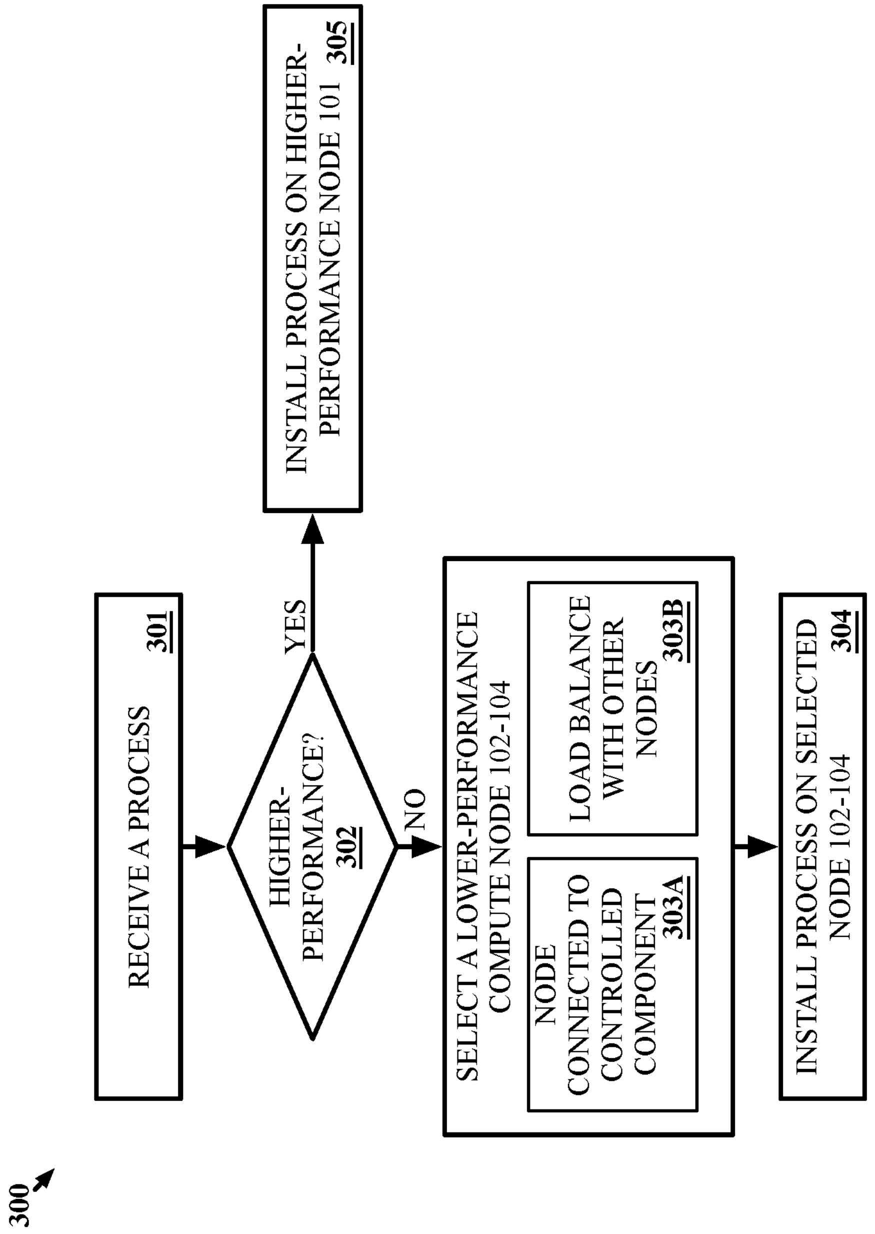
FIG. 3 illustrates an operation to provide software-defined vehicle functions using asymmetric distributed compute nodes.

FIG. 3 illustrates operation 300 to provide software-defined vehicle functions using asymmetric distributed compute nodes. Operation 300 is an example for how a process received by asymmetric distributed compute nodes 101-104 may be assigned to one of asymmetric distributed compute nodes 101-104. The process may be a new process or an update to a process already being executed. A control process may execute on one or more of asymmetric distributed compute nodes 101-104 to perform operation 300. As such, the process for selecting nodes for processes may be a distributed process across asymmetric distributed compute nodes 101-104 themselves.

In operation 300, a process is received for installation on a node of asymmetric distributed compute nodes 101-104 (step 301). The process may be received as an over-the-air update to processes executing on asymmetric distributed compute nodes 101-104, as is becoming more common, or may be received from some other source (e.g., a service technician uploading the process from a user device to one of asymmetric distributed compute nodes 101-104). In this example, the process does not identify a specific node on which it should be installed to asymmetric distributed compute nodes 101-104. As such, asymmetric distributed compute nodes 101-104 determine whether the received process needs to execute on higher-performance node 101 to perform properly (step 302). The received process may define node attributes, such as memory, processing resources (e.g., speed, number of cores, etc.), peripherals, or some other node attribute-including combinations thereof. If those attributes can only be supplied by a higher-performance compute node, then the process is assigned to higher-performance node 101. Specifically, asymmetric distributed compute nodes 101-104 install the process on higher-performance node 101 (step 305). Other manners of determining that a higher-performance compute node should execute the process may also be used. In some examples, more than one higher-performance compute node may be connected to communication backbone 111. In those examples, determinations similar to those made in step 303 described below may be performed to select one of the higher-performance compute nodes.

If the process can execute properly on a lower-performance compute node, then asymmetric distributed compute nodes 101-104 may use rules to select which of lower-performance nodes 102-104 the process should be assigned. In one example, a node of lower-performance nodes 102-104 is selected that is connected to a component controlled by the process (step 303A). For instance, if the process controls the automatic windshield wipers for vehicle 131, then a node may be selected to which the windshield wipers are connected. By selecting the node connected to the wipers, control of the wipers can be performed without having to send control messages over communication backbone 111 to another node. In another example, a load balancing algorithm may be performed to select one of lower-performance nodes 102-104 that balances the processing load among lower-performance nodes 102-104 (step 303B). Other manners of selecting nodes may also be used, such as random selection or round-robin selection. Additionally, in some examples, higher-performance node 101 may also be considered when determining which node to select. Even though a process may not require the additional performance of higher-performance node 101 to execute properly, the process can still execute on higher-performance node 101 and it may be preferable for the process to do so (e.g., based on load balancing determinations or higher-performance node 101 being connected to a controlled vehicle component).

Once selected, the process is assigned to the selected node by installing the process on the selected node (step 304). For example, the process may be installed on lower-performance node 102 to become part of processes 122. In some cases, load balancing may cause other processes to be moved to other nodes. For instance, the load balancing algorithm may determine that one or more processes on the selected node should be reassigned to maintain proper balance of processes 121-124 across asymmetric distributed compute nodes 101-104 when the received process is installed on the selected node.

Figure 4:
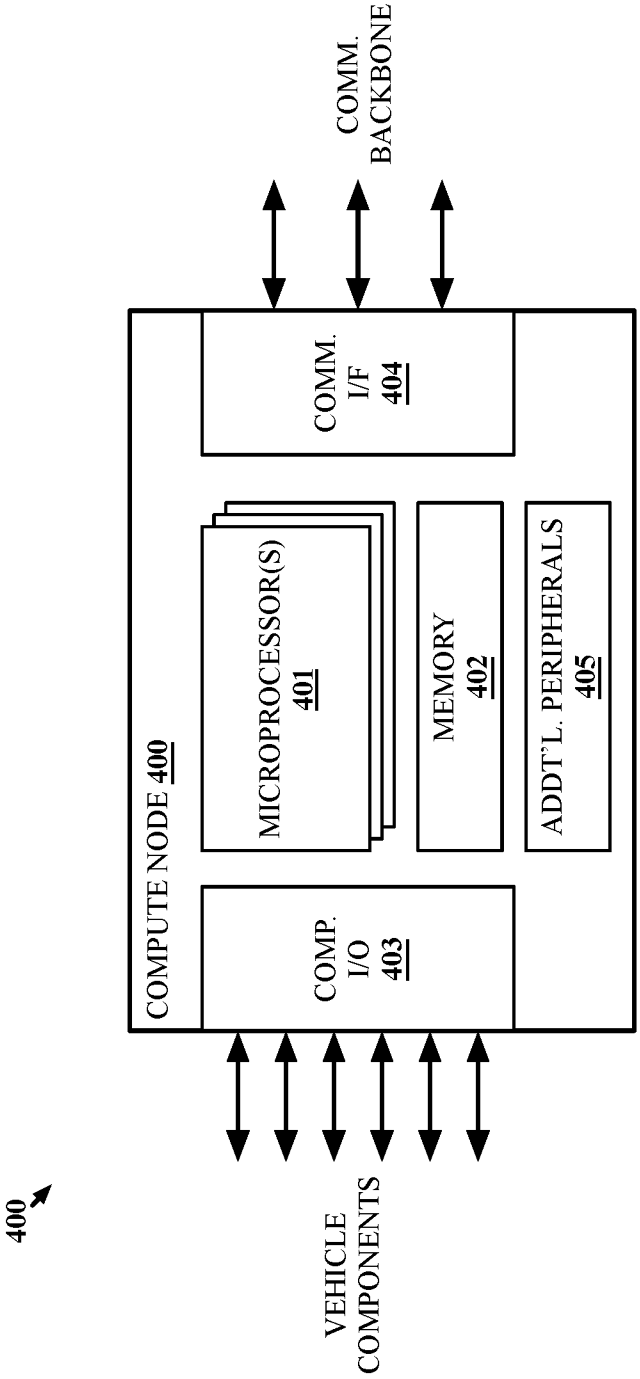
FIG. 4 illustrates compute node 400 for providing software-defined vehicle functions using asymmetric distributed compute nodes.

FIG. 4 illustrates compute node 400 for providing software-defined vehicle functions using asymmetric distributed compute nodes. Compute node 400 is an example architecture for the nodes of asymmetric distributed compute nodes 101-104. Compute node 400 includes one or more microprocessors 401, memory 402, component I/O 403, communication interface 404, and additional peripherals 405. Each of microprocessors 401 may include multiple processing cores and cache memory. The processing cores in microprocessors 401 may also include higher power cores and lower power cores depending on the needs of a process being executed. While shown separately, one or more of elements 401-405 may be combined onto an integrated circuit, sometimes referred to as a system-on-a-chip (SoC). System buses, or other internal communication links, connect those of elements 401-405 that are separate. A similar processing architecture may be shared between microprocessors 401 on higher-performance compute nodes and lower-performance compute nodes (e.g., may be different tiers of the same family of microprocessors from a manufacturer). Using a similar architecture enables processes to be written for the architecture allowing the processes to execute on either higher-performance compute nodes or lower-performance compute nodes assuming processing performance allows the processes to execute properly. In some examples, hardware may be virtualized by microprocessors 401 (e.g., to create a virtual machine using a hypervisor) and processes may execute on the virtualized hardware rather than natively on microprocessors 401.

Memory 402 may include random access memory, read only memory, magnetic disks, optical disks, and flash memory, as well as any combination or variation thereof, or any other type of storage media. In no examples would storage media included in memory 402, or any other computer-readable storage medium herein, be considered a transitory form of signal transmission (often referred to as "signals per se"), such as a propagating electrical or electromagnetic signal or carrier wave. Memory 402 may be configured to store processes for execution by microprocessors 401 to provide software-defined vehicle functions for vehicle 131.

Communication interface 404 includes components that connect to communication backbone 111, such as network cards, ports, radio frequency (RF), processing circuitry and software, or some other communication devices. Communication interface 404 may be configured to communicate over metallic, wireless, or optical links. Communication interface 404 may be configured to use Internet Protocol (IP), Ethernet, optical networking, wireless protocols, communication signaling, or some other communication format-including combinations thereof.

Component I/O 403 includes input and output interfaces for interacting with vehicle components external to asymmetric distributed compute nodes 101-104. Component I/O 403 may be different for each of asymmetric distributed compute nodes 101-104 depending on which vehicle components compute node 400 is configured to connect. Component I/O 403 may include analog, digital, pulse width modulation (PWM), or some other type of signal interfaces.

Additional peripherals 405 include other compute elements that compute node 400 may employ to provide software-defined vehicle functions. For example, additional peripherals 405 may include a cellular modem to connect asymmetric distributed compute nodes 101-104 to a cellular network over which processes can be received and data can be exchanged for providing software-defined vehicle functions. Other examples of additional peripherals 405 may include a graphics processing unit (GPU), audio amplifier, or some other type of peripheral.

Since compute node 400 represents an architecture for both higher-performance node 101 and lower-performance nodes 102-104, the exact component configuration may differ between node types. For example, compute node 400 for higher-performance node 101 may include more microprocessors 401 or higher performance processing cores within microprocessors 401, faster forms of memory 402, additional storage media in memory 402 (e.g., additional flash memory to store processes for execution), or other performance differentiators. Additional peripherals 405 may be different for different nodes as well (e.g., one node may include a cellular modem). In some examples, the additional performance of a higher-performance compute node may necessitate the inclusion of a more powerful power supply or more extensive cooling to handle the additional power used. The lack of such extra components in a lower-performance compute node may further enhance the cost benefits of lower-performance compute nodes relative to higher-performance compute nodes. Similarly, enabling processes to run on lower-performance compute nodes that use less power enhances energy efficiency of vehicle 131.

Figure 5:
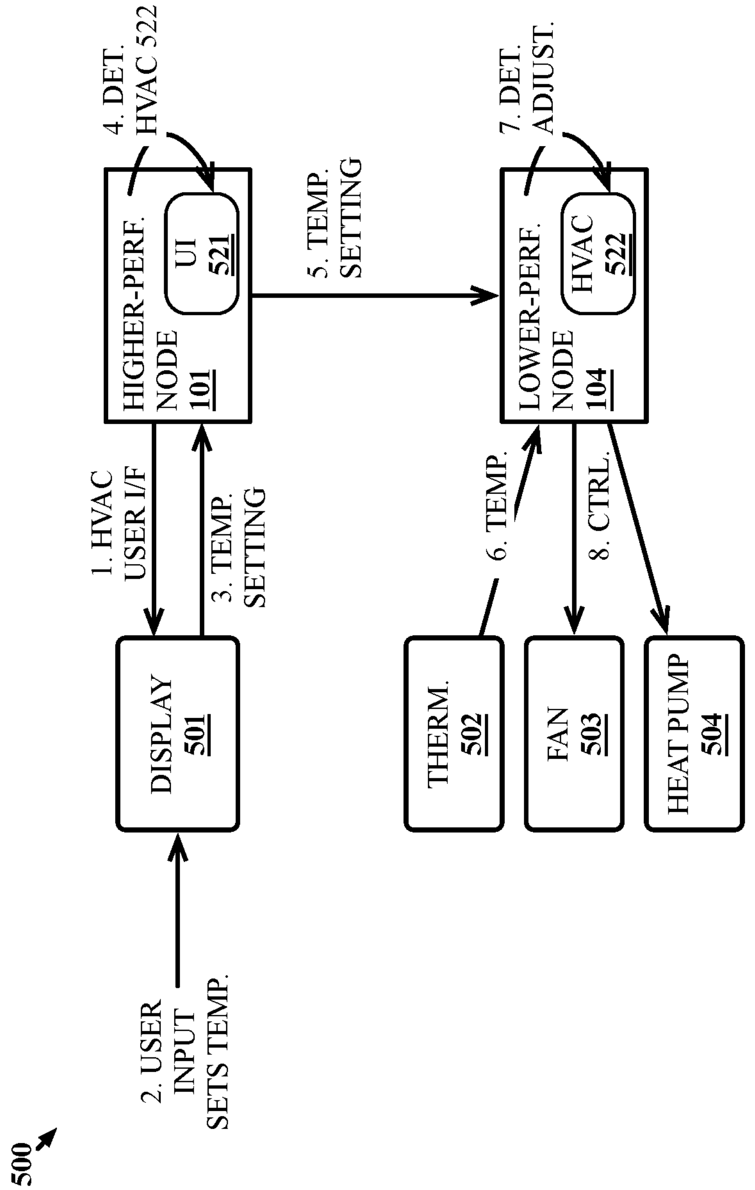
FIG. 5 illustrates an operational scenario to provide software-defined vehicle functions using asymmetric distributed compute nodes.

FIG. 5 illustrates operational scenario 500 to provide software-defined vehicle functions using asymmetric distributed compute nodes. Operational scenario 500 is an example for how processes may be distributed across asymmetric distributed compute nodes 101-104 to provide a software-defined HVAC function for vehicle 131. In this example, user interface process 521 is one of processes 121 executing on higher-performance node 101. User interface process 521 is a process that controls the presentation of a user interface for vehicle 131 on display 501, which is a display in vehicle 131. As such, in this example, additional peripherals 405 of higher-performance node 101 include a GPU to generate a graphical interface and component I/O 403 includes a video interface (e.g., DisplayPort or High-Definition Multimedia Interface (HDMI)). The video interface in this case also enables input from display 501 being a touch screen, although other input mechanisms, such as a trackpad, hand gesture, voice control, etc., may be used. User interface process 521 may have been identified for execution on higher-performance node 101 because it requires execution on the same node to which display 501 is connected, it requires the performance of higher-performance node 101 to execute properly, or for some other reason-including combinations thereof. In some examples, user interface process 521 may display interfaces on behalf of other processes. For instance, user interface process 521 may be part of an operating system in which others of processes 121 execute. The operating system on each node may be a real-time operating system since at least some of processes 121-124 (e.g., those controlling safety functions) may include critically defined time constraints to ensure proper vehicle operation.

In operational scenario 500, user interface process 521 directs higher-performance node 101 to display an HVAC user interface at step 1 on display 501. The HVAC user interface may be part of a larger user interface for a user to interact with functions of vehicle 131. For example, the user interface may include sections (e.g., windows, tabs, screen zones, etc.) displaying information and user-selectable buttons for functions including HVAC, radio, media, navigation, gaming, vehicle settings, or any other type of function that a user may be able to control or receive information about in vehicle 131. The HVAC user interface of this example at least enables a user to select a temperature that for the HVAC system of vehicle 131 to hold automatically. The HVAC user interface may also include other options, such as manual fan control, air conditioning control, vent direction, or some other adjustable feature for a vehicle HVAC system-including combinations thereof. A user in vehicle 131 (e.g., the driver or a passenger) selects a desired temperature at step 2 for the interior of vehicle 131. For example, the user may touch up/down arrows of the HVAC user interface until a desired temperature is reached. The user input is relayed at step 3 to higher-performance node 101 via component I/O 403 of higher-performance node 101 to indicate the desired temperature.

Upon receiving the user input, user interface process 521 determines at step 4 that the input is intended for HVAC process 522. In this example, the HVAC user interface provided by user interface process 521 is associated with functions controlled by HVAC process 522 so user interface process 521 knows to pass the input to HVAC process 522. Accordingly, user interface process 521 transmits a message over communication backbone 111 at step 5 indicating the temperature setting to lower-performance node 104 on which HVAC process 522 is executing. The message may be in any format capable of being transmitted over communication backbone 111 and readable by HVAC process 522 at lower-performance node 104. HVAC process 522 may have been selected to execute on lower-performance node 104, as opposed to another of lower-performance nodes 102-104, because component I/O 403 of lower-performance node 104 is connected to HVAC components thermometer 502, fan 503, and heat pump 504. Although, in other examples, one or more of components 502-504 may be connected to another of asymmetric distributed compute nodes 101-104.

Thermometer 502 provides the current internal temperature within vehicle 131 at step 6 to HVAC process 522 via component I/O 403 of lower-performance node 104. HVAC process 522 determines how fan 503 and heat pump 504 should be controlled at step 7 to adjust the internal temperature of vehicle 131 to the set temperature. For example, if the current temperature is below the set temperature, then HVAC process 522 may determine to increase fan speed of fan 503 and trigger heat pump 504 to produce hot air. HVAC process 522 provides control signals to fan 503 and heat pump 504 at step 8 via component I/O 403 of lower-performance node 104 to achieve the set temperature adjustment. HVAC process 522 may continue controlling thermometer 502 and heat pump 504 once the set temperature is reached to ensure the current interior temperature remains at the set temp as indicated by thermometer 502.

While not shown in this example, HVAC process 522 may transmit a message indicating the current interior temperature over communication backbone 111 back to higher-performance node 101 so that user interface process 521 can present the current temperature on display 501.

Figure 6:
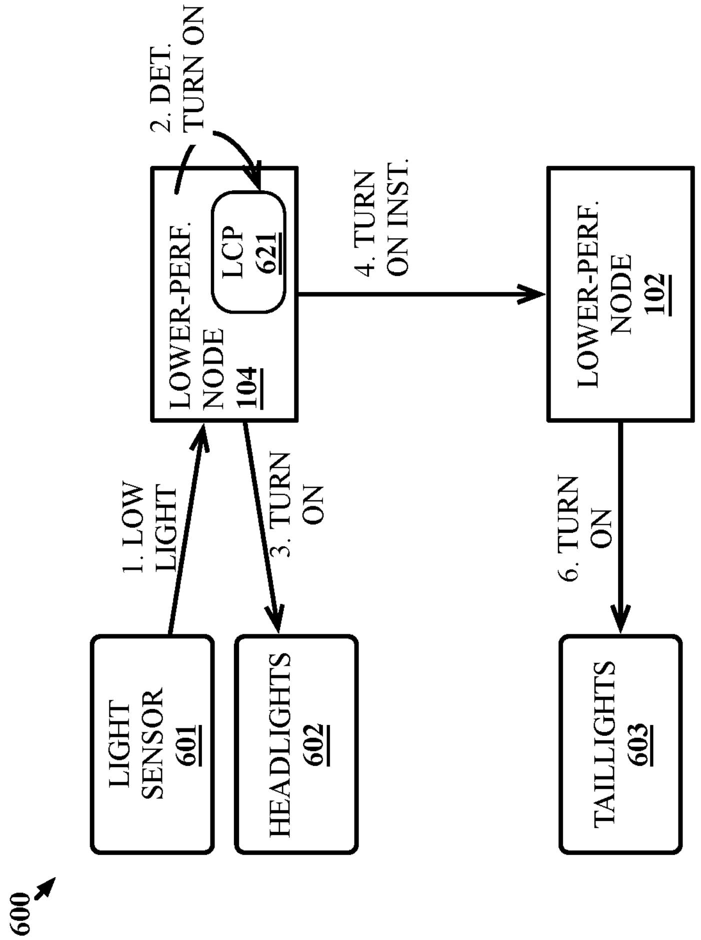
FIG. 6 illustrates an operational scenario to provide software-defined vehicle functions using asymmetric distributed compute nodes.

FIG. 6 illustrates operational scenario 600 to provide software-defined vehicle functions using asymmetric distributed compute nodes. While operational scenario 500 is an example of process-to-process communication between nodes, the vehicle components controlled by the respective processes were connected to the same node as the processes. Operational scenario 600 is an example where a process executing on one node controls a vehicle component connected to another node. Specifically, light control process 621 is a process for providing an automatic headlight function. Light control process 621 is executing on lower-performance node 104 and may have been selected for execution thereon due to light control process 621 being able to execute properly on a lower-performance compute node and component I/O 403 of lower-performance node 104 being connected to light sensor 601 and headlights 602. Lower-performance node 104 may be positioned at the front of vehicle 131 closest to light sensor 601 and headlights 602 relative to other asymmetric distributed compute nodes 101-104. Taillights 603 being located at the back of vehicle 131 would require wiring all the way up to the front of vehicle 131 if taillights 603 were also connected to lower-performance node 104 at the front of vehicle 131. As such, in this example, taillights 603 are connected to lower-performance node 102, which may be located at the back of vehicle 131 closer to taillights 603.

In operational scenario 600, light sensor 601 provides an indication of low external light level at step 1 to light control process 621 via component I/O 403 of lower-performance node 104. The indication may explicitly inform light control process 621 that the light level has fallen below a threshold or may provide an amount of light that light control process 621 compares to a threshold amount of light. When the light level falls below a threshold amount of light, light control process 621 determines at step 2 that headlights 602 and taillights 603 should be turned on. In response to the determination, light control process 621 directs headlights 602 to turn on at step 3.

When headlights 602 are on, taillights 603 should also be on. Therefore, light control process 621 transmits a message over communication backbone 111 at step 4 with an instruction to turn on taillights 603. In some examples, light control process 621 may be aware that taillights 603 are connected to lower-performance node 102 and direct the message to lower-performance node 102. In other examples, light control process 621 may rely on another process of lower-performance node 104 to know that taillights 603 is connected to lower-performance node 102 and direct the message to lower-performance node 102 accordingly.

Upon receiving the message from lower-performance node 104, lower-performance node 102 controls taillights 603 to turn on at step 6 via component I/O 403 of lower-performance node 102. Thus, upon completion of step 6, both headlights 602 and taillights 603 have been turned on to account for the low-light situation external to vehicle 131. If the message from lower-performance node 104 is formatted and/or addressed in a manner that directs it to component I/O 403 of lower-performance node 102, then lower-performance node 102 may act as a zonal gateway between taillights 603 and lower-performance node 104. In other examples, a process of processes 122 executing on lower-performance node 102 may be configured to receive the message, determine that the message includes an instruction to taillights 603, and comply with the instruction by directing taillights 603 to turn on via component I/O 403 of lower-performance node 102. Similar routing circumstances may exist for information flowing from a component connected to component I/O 403 of lower-performance node 102 to other nodes. That is, sensor information may be automatically addressed/formatted for lower-performance node 102 to act as a zonal gateway directing the information to another node or a process executing on lower-performance node 102 may handle the routing of the information to another node.

In an example above, lower-performance node 102 may act as a zonal gateway. In some examples, communication backbone 111 may connect one or more zonal gateways to asymmetric distributed compute nodes 101-104. A zonal gateway includes component I/O 403 for vehicle components attached thereto and communication interface 404 to connect to communication backbone 111. Thus, a zonal gateway may provide an additional location in vehicle 131 to attach vehicle components while the processes that control those vehicle components execute on asymmetric distributed compute nodes 101-104.

Figure 7:
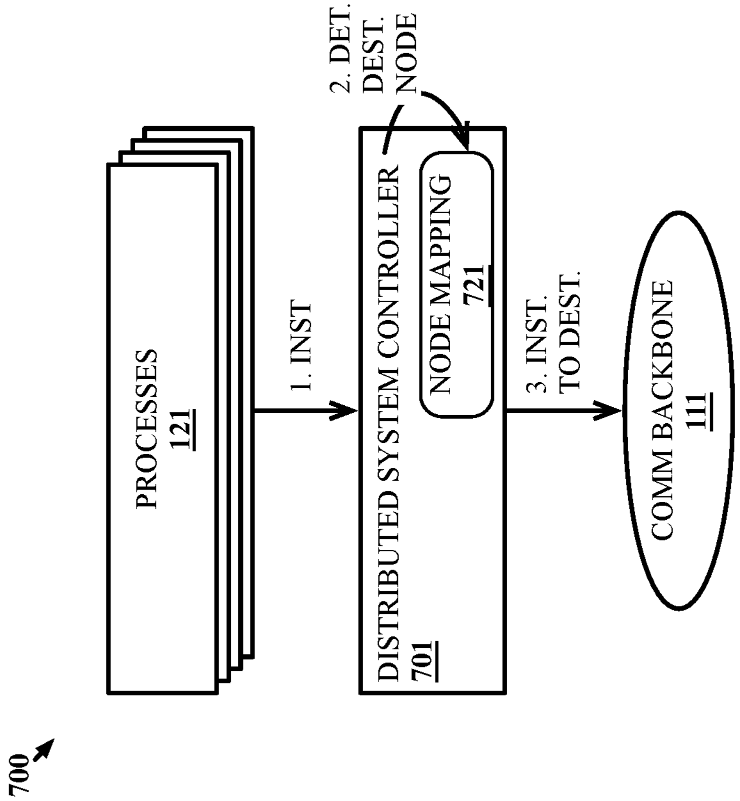
FIG. 7 illustrates an operational scenario to provide software-defined vehicle functions using asymmetric distributed compute nodes.

FIG. 7 illustrates operational scenario 700 to provide software-defined vehicle functions using asymmetric distributed compute nodes. Operational scenario 700 is an example where distributed system controller 701 is executing on higher-performance node 101 with processes 121. In some cases, distributed system controller 701 may itself be considered one of processes 121. Distributed system controller 701 may handle the decisions performed in operation 200 and operation 300 above to identify and distribute processes across asymmetric distributed compute nodes 101-104.

In this example, distributed system controller 701 is configured to handle routing of instructions between nodes of asymmetric distributed compute nodes 101-104. Relying on distributed system controller 701 for routing, processes 121 do not need to be aware of which other nodes are connected to vehicle components controlled by thereby. When an instruction is received from processes 121 at step 1, distributed system controller 701 determines a destination node of asymmetric distributed compute nodes 101-104 at step 2 based on node mapping 721. Node mapping 721 is information that indicate which nodes include which vehicle components and which nodes are executing which processes. Distributed system controller 701 may update the mapping as needed when new processes are installed in asymmetric distributed compute nodes 101-104 or processes are moved between asymmetric distributed compute nodes 101-104. In this example, once distributed system controller 701 has determined a destination node for the instruction, distributed system controller 701 sends the instruction at step 3 to the destination node in a message over communication backbone 111 via communication interface 404 of higher-performance node 101.

Other nodes of asymmetric distributed compute nodes 101-104 may execute similar processes to distributed system controller 701 to route messages between nodes. Using the example from operational scenario 600, light control process 621 passes the instruction to turn on taillights 603 to a version of distributed system controller 701 executing on lower-performance node 104. That version of distributed system controller 701 determines based on a mapping like node mapping 721 that the instruction need be sent to lower-performance node 102 because lower-performance node 102 is connected to taillights 603. The message with the instruction is sent to lower-performance node 102 accordingly.

In some examples, distributed system controller 701 may be configured to route control instructions to vehicle components connected to the same node. For instance, upon receiving an instruction from processes 121, distributed system controller 701 may determine if the instruction applies to a vehicle component connected to higher-performance node 101 and route the instruction to component I/O 403 for that component. In other words, a process can be configured to generate control instructions for a vehicle component without having to consider to which node the vehicle component is connected. Distributed system controller 701 will ensure the instruction ends up at the right node. Additionally, distributed system controller 701 may be configured to handle incoming messages from communication backbone 111 and route the incoming message to the one of processes 121 or vehicle components to which they are directed (or similarly handle incoming information from component I/O 403 of higher-performance node 101). Distributed system controller 701, when executing on each of asymmetric distributed compute nodes 101-104, ensures the vehicle functions provided by processes 121-124 perform as seamlessly as they would if they were all executing on the same compute node. In some examples, the instances of distributed system controller 701 executing on lower-performance node 102 may include fewer features than distributed system controller 701 on higher-performance node 101 because distributed system controller 701 on higher-performance node 101 may handle all the logic for distributing processes 121 across asymmetric distributed compute nodes 101-104 (e.g., distributed system controller 701 on higher-performance node 101 may enable higher-performance node 101 to act as a master node of asymmetric distributed compute nodes 101-104). Other nodes may instead be the master in other examples and the master node may change should a previous master node fail.

A process like distributed system controller 701 may further handle determining the health status of other nodes. For example, each node may transmit heartbeat messages to distributed system controller 701 indicating that they are running. Should a node fail (e.g., as indicated by the lack of a heartbeat message for a period of time), distributed system controller 701 may perform operation 300 for the processes of the failed node to redistribute the processes across the remaining nodes.

Figure 8:
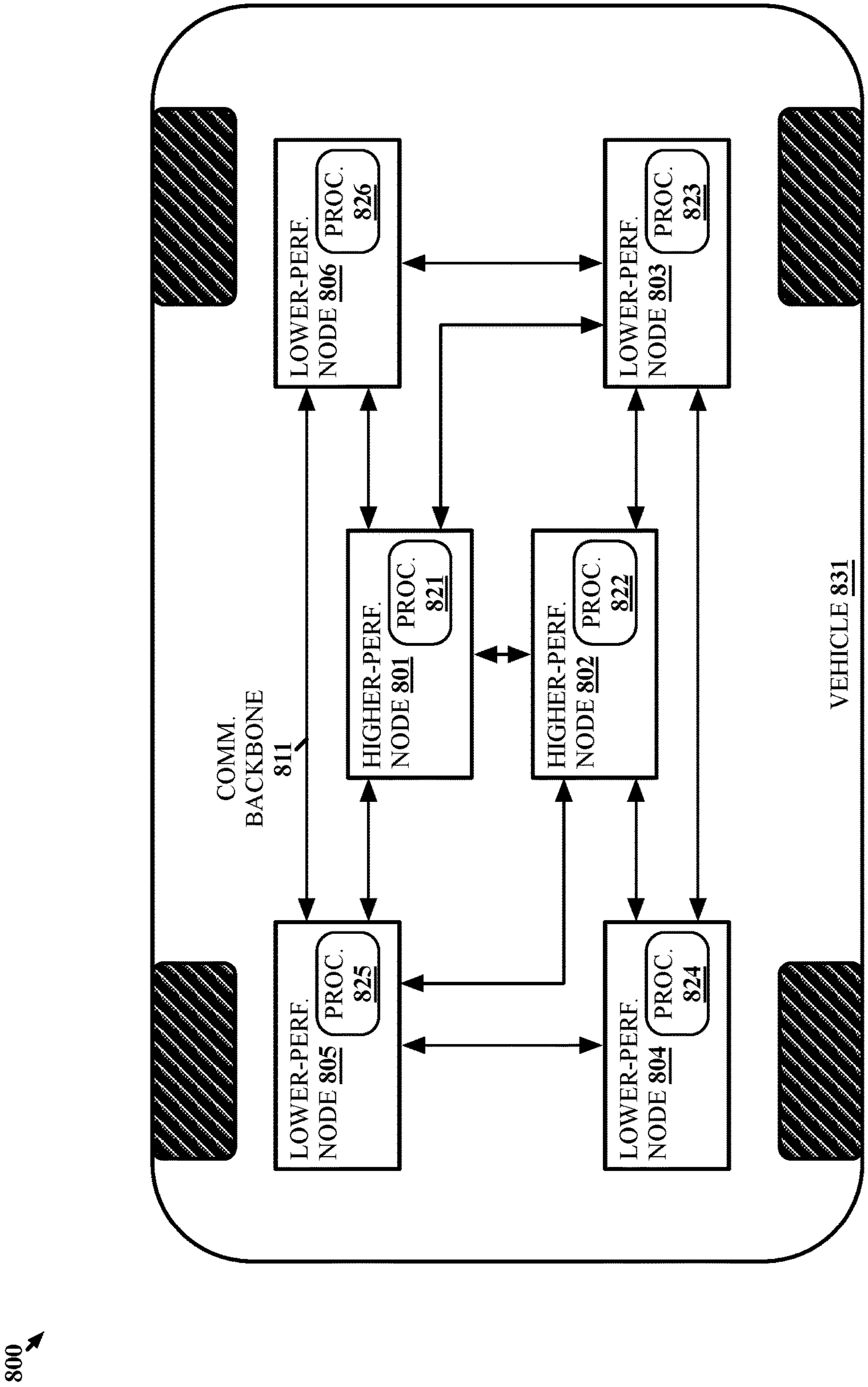
FIG. 8 illustrates an implementation for providing software-defined vehicle functions using asymmetric distributed compute nodes.

FIG. 8 illustrates implementation 800 for providing software-defined vehicle functions using asymmetric distributed compute nodes. Implementation 800 is an example similar to implementation 100 but showing that multiple higher-performance compute nodes may exist in a vehicle. In this case, asymmetric distributed compute nodes 801-806 are included in vehicle 831. Asymmetric distributed compute nodes 801-806 include higher-performance nodes 801-802 and lower-performance compute nodes 803-806. Asymmetric distributed compute nodes 801-806 execute processes 821-826 respectively. Asymmetric distributed compute nodes 801-806 communicate over communication backbone 811. While specific links are shown in implementation 800 as part of communication backbone 811, different link arrangements may be used in other examples. For instance, while no direct link exists between lower-performance compute node 806 and lower-performance compute node 804, other arrangements of communication backbone 811 may include such a link so messages do not need to be routed through another node.

Since asymmetric distributed compute nodes 801-806 include multiple higher-performance compute nodes, processes identified for execution on a higher-performance compute node will be distributed between higher-performance compute node 801 and higher-performance compute node 802. Logic similar to that used in step 303 of operation 300 above may be employed to determine which processes should execute on which of higher-performance compute nodes 801-802. Similarly, since asymmetric distributed compute nodes 801-806 include four lower-performance compute nodes, processes identified for execution on a lower-performance compute node will be distributed across four nodes rather than three, as was the case with implementation 100.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.CLAIMS

What is claimed is:

1. A system to provide asymmetric distributed compute nodes in a vehicle for software-defined vehicle functions, the system comprising:

one or more higher-performance compute nodes of the asymmetric distributed compute nodes, wherein the one or more higher-performance compute nodes include one or more physical components that enhance capabilities of the one or more higher-performance compute nodes relative to one or more lower-performance compute nodes;

the one or more lower-performance compute nodes of the asymmetric distributed compute nodes; and a communication backbone over which the one or more higher-performance compute nodes and the one or more lower-performance compute nodes communicate;

wherein the one or more higher-performance compute nodes execute first processes for performing a first portion of the software-defined vehicle functions for the vehicle;

wherein the one or more lower-performance compute nodes execute second processes for performing a second portion of the software-defined vehicle functions for the vehicle;

wherein a first instance of a process of the second processes is active and assigned to a first compute node of the one or more lower-performance compute nodes, and a second instance of the process is on standby and assigned to a second compute node of the one or more lower-performance compute nodes; and wherein the second instance activates upon failure of the first instance.

2. The system of claim 1, wherein the one or more higher-performance compute nodes and the one or more lower-performance compute nodes include input and output interfaces for interacting with vehicle components.

3. The system of claim 1, comprising:

a zonal gateway connected to the communication backbone, wherein a vehicle component is connected to the zonal gateway;

wherein one of the first or second processes controls the vehicle component over the communication backbone via the zonal gateway.

4. The system of claim 1, wherein the first processes and the second processes are configured to execute on a processing architecture shared by the one or more higher-performance compute nodes and the one or more lower-performance compute nodes.

5. The system of claim 1, wherein the first processes and the second processes are load balanced across the one or more higher-performance compute nodes and the one or more lower-performance compute nodes.

6. The system of claim 1, wherein the one or more lower-performance compute nodes are located remotely in the vehicle from the one or more higher-performance compute nodes.

7. The system of claim 6, wherein given compute node of the one or more lower-performance compute nodes is physically located closer to vehicle components connected thereto than another compute node of the one or more lower-performance compute nodes.

8. The system of claim 7, wherein a component process of the second processes is executing on the first compute node to interact with one or more of the vehicle components.

9. The system of claim 1, wherein a given compute node of the one or more lower-performance compute nodes controls a vehicle component connected thereto in response to an instruction received over the communication backbone.

10. A method for providing software-defined vehicle functions via asymmetric distributed compute nodes in a vehicle, the method comprising:

identifying first processes for execution on one or more higher-performance compute nodes of the asymmetric distributed compute nodes, wherein the one or more higher-performance compute nodes include one or more physical components that enhance capabilities of the one or more higher-performance compute nodes relative to one or more lower-performance compute nodes;

identifying second processes for execution on the one or more lower-performance compute nodes of the asymmetric distributed compute nodes;

directing the one or more higher-performance compute nodes to execute the first processes to perform a first portion of the software-defined vehicle functions for the vehicle; and directing the one or more lower-performance compute nodes to execute the second processes to perform a second portion of the software-defined vehicle functions for the vehicle, including:

assigning a first instance of a process of the second processes to a first compute node of the one or more lower-performance compute nodes and a second instance of the process to a second compute node of the one or more lower-performance compute nodes, wherein the first instance is active and the second instance is on standby; and upon the first instance failing, activating the second instance.

11. The method of claim 10, wherein the software-defined vehicle functions interact with vehicle components connected to the one or more higher-performance compute nodes and the one or more lower-performance compute nodes.

12. The method of claim 10, wherein identifying the second processes comprises:

determining the second processes execute properly at a performance level of the one or more lower-performance compute nodes.

13. The method of claim 10, wherein directing the one or more lower-performance compute nodes to execute the second processes comprises:

load balancing the second processes between the one or more lower-performance compute nodes.

14. The method of claim 10, wherein directing the one or more lower-performance compute nodes to execute the second processes comprises:

assigning a component process of the second processes to a compute node of the one or more lower-performance compute nodes connected to a vehicle component with which the process interacts.

15. The method of claim 10, wherein identifying the first processes comprises:

determining at least a portion of the first processes necessitate a performance level of the one or more higher-performance compute nodes.

16. The method of claim 10, comprising:

determining that a compute node of the one or more lower-performance compute nodes can no longer handle a process of the second processes; and reassigning the process to a different compute node of the asymmetric distributed compute nodes.

17. An apparatus to provide asymmetric distributed compute nodes in a vehicle for software-defined vehicle functions, the apparatus comprising:

one or more microprocessors, wherein the one or more microprocessors execute first processes for performing a first portion of the software-defined vehicle functions for the vehicle;

input and output interfaces connected to vehicle components of the vehicle; and a network interface connected to a communication backbone to communicate with other compute nodes of the asymmetric distributed compute nodes;

wherein the other compute nodes execute second processes for performing a second portion of the software-defined vehicle functions for the vehicle;

wherein a first instance of a process of the second processes is active and assigned to the apparatus, and a second instance of the process is on standby and assigned to a compute node of the other compute nodes; and wherein the second instance activates upon failure of the first instance.

18. The apparatus of claim 17, wherein the one or more microprocessors have a lower level of performance than microprocessors of at least one of the other compute nodes.

19. The apparatus of claim 17, wherein a component process of the first processes directs the one or more microprocessors to interact with a vehicle component of the vehicle components.

* * * * *